(12) United States Patent
Kuban et al.

(10) Patent No.: US 9,590,374 B2
(45) Date of Patent: Mar. 7, 2017

(54) BRUSH HOLDER APPARATUS

(71) Applicant: General Electric Company, Schenectady, NY (US)

(72) Inventors: Michael David Kuban, Schenectady, NY (US); Paul August Quail, Ballston Lake, NY (US); Albert Eugene Steinbach, Rotterdam, NY (US)

(73) Assignee: General Electric Company, Schenectady, NY (US)

( * ) Notice: Subject to any disclaimer, the term of this patent is extended or adjusted under 35 U.S.C. 154(b) by 614 days.

(21) Appl. No.: 14/061,209

(22) Filed: Oct. 23, 2013

(65) Prior Publication Data
US 2014/0045349 A1    Feb. 13, 2014

Related U.S. Application Data

(62) Division of application No. 13/028,848, filed on Feb. 16, 2011, now Pat. No. 8,618,713.

(51) Int. Cl.
| | |
|---|---|
| *H02K 5/14* | (2006.01) |
| *H02K 13/00* | (2006.01) |
| *H01R 39/38* | (2006.01) |
| *H01R 39/40* | (2006.01) |

(52) U.S. Cl.
CPC .......... *H01R 39/381* (2013.01); *H01R 39/40* (2013.01); *H02K 5/141* (2013.01); *H02K 5/148* (2013.01); *H02K 5/14* (2013.01); *H02K 5/143* (2013.01); *H02K 2205/06* (2013.01)

(58) Field of Classification Search
CPC .......... H02K 5/14; H02K 5/141; H02K 5/143; H02K 5/148; H01R 39/38; H01R 39/381; H01R 39/40

USPC .................................................. 310/239–247
See application file for complete search history.

(56) References Cited

U.S. PATENT DOCUMENTS

| | | | | |
|---|---|---|---|---|
| 2,775,717 | A | * | 12/1956 | Laing .................. H01R 39/38 310/246 |
| 3,387,155 | A | * | 6/1968 | Krulls ..................... H02K 5/14 310/239 |
| 3,432,708 | A | | 3/1969 | Bissett |
| 3,710,478 | A | | 1/1973 | Krulls et al. |
| 3,864,803 | A | | 2/1975 | Ohmstedt et al. |
| 3,968,391 | A | * | 7/1976 | Blank .................... H02K 5/141 310/240 |

(Continued)

FOREIGN PATENT DOCUMENTS

| | | |
|---|---|---|
| GB | 2476719 A | 7/2011 |
| SU | 1348961 A1 | 10/1987 |

OTHER PUBLICATIONS

GB Application No. 1202494.9, International Search Report dated Jun. 12, 2012.

(Continued)

*Primary Examiner* — John K Kim
(74) *Attorney, Agent, or Firm* — Ernest G. Cusick; Hoffman Warnick LLC

(57) ABSTRACT

Various embodiments include a brush holder apparatus. In one embodiment, a brush holder apparatus for receiving a brush includes: a first support member; a box member affixed to the first support member; and a cam member operably connected to the first support member, the cam member configured to retain the brush against an inner surface of the box member.

11 Claims, 6 Drawing Sheets

(56) References Cited

U.S. PATENT DOCUMENTS

| | | | |
|---|---|---|---|
| 4,296,346 A * | 10/1981 | Ooki | H02K 5/141 |
| | | | 310/240 |
| 4,329,611 A | 5/1982 | Ohmstedt et al. | |
| 4,663,552 A * | 5/1987 | Ohmstedt | H02K 9/28 |
| | | | 310/239 |
| 4,739,208 A | 4/1988 | Kimberlin | |
| 4,831,302 A * | 5/1989 | Dietrich | H01R 39/58 |
| | | | 200/61.58 R |
| 5,043,619 A | 8/1991 | Kartman, Jr. | |
| 5,256,925 A | 10/1993 | Cutsforth | |
| 7,034,430 B2 | 4/2006 | Custforth et al. | |
| 7,122,935 B2 | 10/2006 | Custforth et al. | |
| 7,218,028 B2 | 5/2007 | Annis et al. | |
| 7,365,470 B1 | 4/2008 | Eger et al. | |
| 2005/0006975 A1 | 1/2005 | Bradfield et al. | |
| 2012/0206010 A1 | 8/2012 | Kuban et al. | |
| 2014/0045349 A1* | 2/2014 | Kuban | H01R 39/40 |
| | | | 439/29 |

OTHER PUBLICATIONS

U.S. Appl. No. 13/208,848, Office Action dated Apr. 18, 2013.
U.S. Appl. No. 13/208,848, Notice of Allowance and Fees Due dated Aug. 22, 2013.

* cited by examiner

BRUSH HOLDER APPARATUS

CROSS-REFERENCE TO RELATED APPLICATIONS

This application is a divisional application of currently pending U.S. patent application Ser. No. 13/028,848, which received a Notice of Allowance on Aug. 22, 2013 and is hereby incorporated by reference in its entirety.

BACKGROUND OF THE INVENTION

The subject matter disclosed herein relates to a brush holder apparatus. Specifically, the subject matter disclosed herein relates to a brush holder apparatus configured to conduct electrical current between a brush and a rotating element of a dynamoelectric machine (e.g., an electrical generator, electrical motor, etc.) and/or another rotating machine (e.g., a rotating crane).

Conventional dynamoelectric machines include a rotor having windings that conduct electrical current during operation of the machine. As the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

Due to a desire to decrease downtime during operation of the dynamoelectric machine, brushes are sometimes replaced during operation of the dynamoelectric machine. In order to replace brushes safely, an operator uses a single hand (in order to avoid conducting electrical current through the operator's body). Conventional brush holders can be heavy and unwieldy, making brush replacement both difficult and dangerous.

BRIEF DESCRIPTION OF THE INVENTION

A brush holder apparatus is disclosed. In one embodiment, the brush holder apparatus includes: a first support member; a second support member affixed to the first support member; a brush retainment member affixed to the first support member and extending substantially parallel with the second support member; and a cam member operably connected to the second support member, the cam member configured to retain a brush against the brush retainment member.

A first aspect of the invention includes a brush holder apparatus having: a first support member; a second support member affixed to the first support member; a brush retainment member affixed to the first support member and extending substantially parallel with the second support member; and a cam member operably connected to the second support member, the cam member configured to retain a brush against the brush retainment member.

A second aspect of the invention includes a brush holder assembly having: a brush; and a brush holder apparatus for receiving the brush, the brush holder apparatus including: a first support member; a box member affixed to the first support member; and a cam member operably connected to the first support member, the cam member configured to retain the brush against an inner surface of the box member.

A third aspect of the invention includes a dynamoelectric machine including: a dynamoelectric machine housing substantially containing: a stator; a rotor collector ring; and a brush holder assembly electrically coupling the rotor collector ring and the stator, the brush holder assembly including: a brush; and a brush holder apparatus for receiving the brush member, the brush holder apparatus including: a first support member; a second support member affixed to and extending substantially perpendicularly from the first support member; a brush retainment member affixed to the first support member and extending substantially parallel with the second support member; and a cam member operably connected to the second support member, the cam member configured to retain the brush against the brush retainment member.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
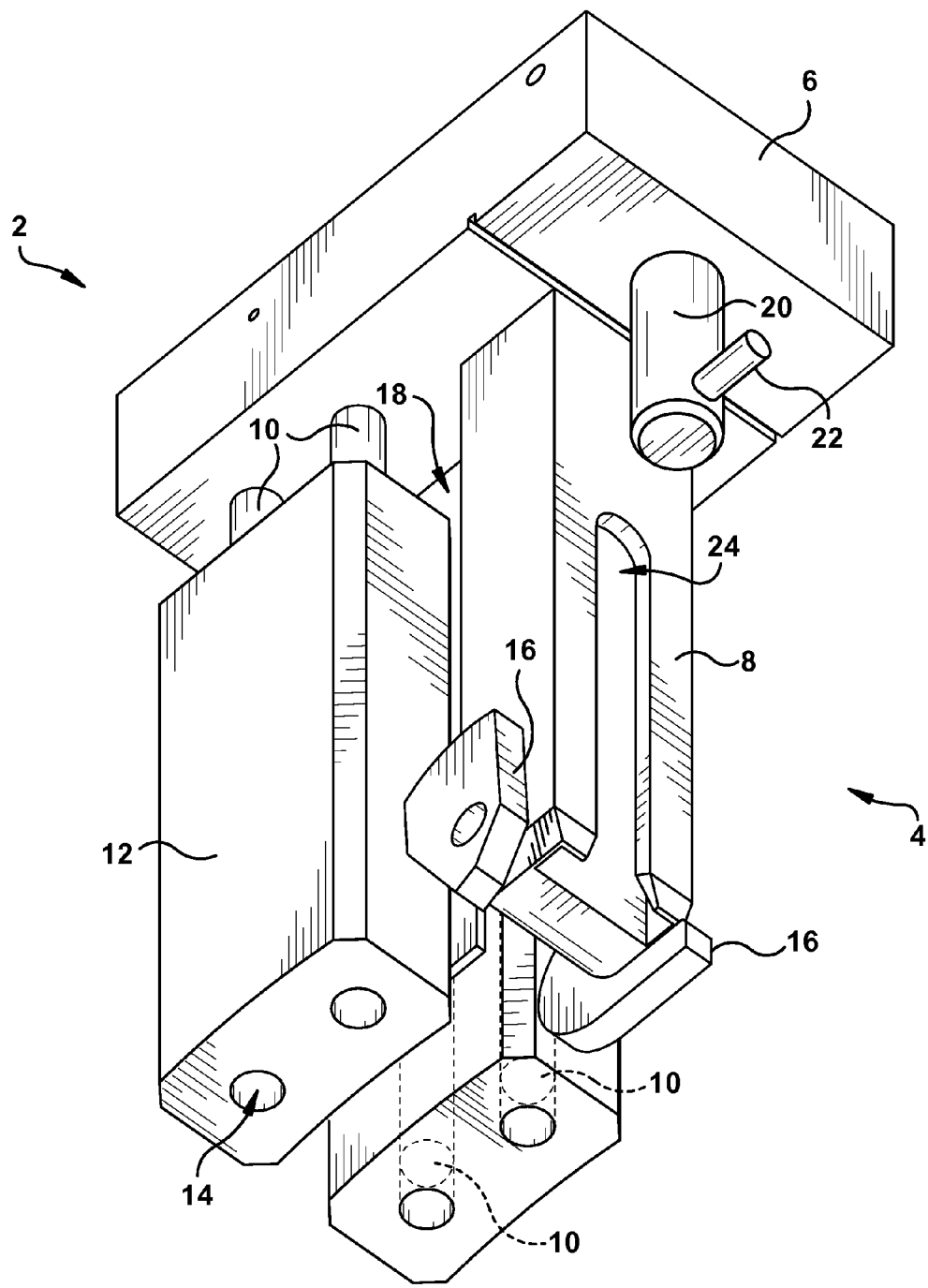
FIG. 1 shows a three-dimensional perspective view of a brush holder assembly according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the invention provide for a brush holder assembly configured to conduct electrical current between a brush and a rotating element of a dynamoelectric machine (e.g., an electrical generator, electrical motor, etc.) and/or another rotating machine (e.g., a rotating crane). In particular, aspects of the invention provide for a brush holder assembly that may aid an operator in safely removing/replacing brushes in a dynamoelectric machine and/or another rotating machine.

As described herein, conventional dynamoelectric machines include a rotor having windings that conduct electrical current during operation of the machine. As the rotor rotates, rotating elements are used to conduct current to the rotor windings from a source external to the rotor. The rotating elements such as collector rings or commutators make contact with brushes to conduct the current. As the brushes are stationary with respect to the rotating elements, the brushes, which are made of carbon, wear due to friction and need periodic replacement.

Due to a desire to decrease downtime during operation of the dynamoelectric machine, brushes are sometimes replaced during operation of the dynamoelectric machine. In order to replace brushes safely, an operator uses a single hand (in order to avoid conducting electrical current through the operator's body). Conventional brush holders can be heavy and unwieldy, making brush replacement both difficult and dangerous.

In contrast to conventional brush holders, aspects of the invention include a brush holder apparatus for a dynamoelectric machine including a rotating cam brush retainer. This cam-style brush retainer may be used, e.g., along with a pin-style brush retainer. This cam-style brush retainer may allow for efficient and safe installation and/or removal of brushes from dynamoelectric machines.

In one embodiment of the invention, a brush holder apparatus is disclosed including: a first support member; a second support member affixed to (and in some cases, extending substantially perpendicularly from) the first support member; a brush retainment member affixed to the first support member and extending substantially parallel with the second support member; and a cam member operably connected to the second support member, the cam member configured to retain a brush against the brush retainment member.

Turning to the drawings, FIG. 1 shows a three-dimensional perspective view of a brush holder assembly 2 including a brush holder apparatus 4, according to embodiments of the invention. In one embodiment, the brush holder apparatus 4 includes a first support member 6 and a second support member 8 affixed to (and extending substantially perpendicularly from) the first support member 6. In one embodiment, the second support member 8 may be connected (e.g., via welding, casting, adhesive, mechanical linkage, etc.) to the first support member 6 proximate to a first end of the second support member 8. The brush holder apparatus 4 may further include a brush retainment member 10 (two shown) affixed to the first support member 6 and extending substantially parallel with the second support member 8. Brush retainment member(s) 10 may be configured to receive a brush 12 having apertures 14 therein. The brush holder apparatus 4 may further include a cam member (two shown) 16 operably connected to the second support member 8 (e.g., proximate a second end of the second support member), where the cam member 16 is configured to retain the brush 12 against the brush retainment member 10. In some embodiments, the cam member 16 may have a rough or toothed surface (which may aid in retaining the brush 12 against the brush retainment member 10). However, in other embodiments, the cam member 16 may have at least one smooth surface. In some embodiments, the brush holder apparatus 4 may be configured to receive the brush 12 and retain the brush 12 in contact with brush retainment member(s) 10 (e.g., via cam member(s) 16) during operation of a dynamoelectric machine (not shown) including the brush holder assembly 2. Cam member(s) 16 may be configured to function as conventional cams, e.g., as devices capable of transferring linear motion into rotational motion (and vice-versa). In some embodiments, cam member 16 may take the shape of an eccentric wheel, eccentric disc, a tooth, an irregular-shaped cylinder or rod, a triangle having rounded edges, etc. The cam member 16 may also take the form of a conventional plate cam. In any case, cam member 16 may be configured to retain the brush 12 in contact with brush retainment member(s) 10 during operation of a dynamoelectric machine including the brush holder assembly 2.

Additionally shown included in brush holder assembly 2 is a spring support septum 18 affixed to first support member 6 and extending substantially perpendicularly from the first support member 6. Spring support septum 18 may be configured to support a brush spring (not shown in this view), where the brush spring may be configured to secure the brush 12 against a moving conductive surface (e.g., a surface of a dynamoelectric machine collector ring, not shown). Also shown in FIG. 1 is a spindle 20 including a spindle lock bar 22 for coupling the support members 6, 8 with a back plate (not shown in this view). In some embodiments, the back plate is configured to complement portions of the second support member 8 (e.g., a dovetail slot 24 of second support member 8).

Figure 2:
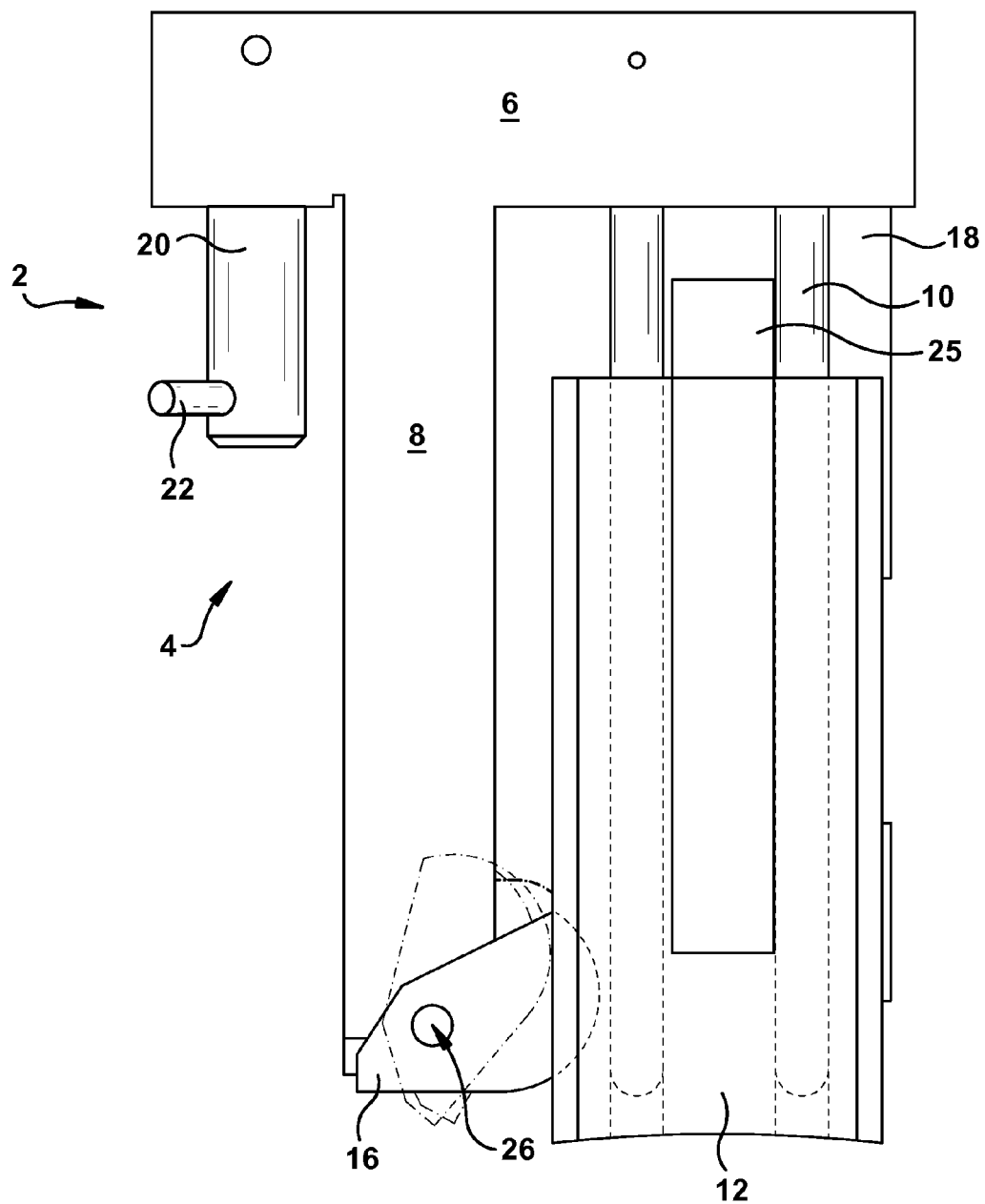
FIG. 2 shows a side view of a brush holder assembly according to embodiments of the invention.

FIG. 2 shows a side view of the brush holder assembly 2 of FIG. 1, further illustrating components not visible from the three-dimensional perspective of FIG. 1. For example, FIG. 2 shows a brush spring 25 supported by the spring support septum 18, where the brush spring 25 is configured to secure the brush 12 against a conductive surface (e.g., a surface of a dynamoelectric machine collector ring, not shown). That is, as in conventional pin-style brush holders, brush spring 25 maintains a downward force on the brush 12 to maintain contact between the brush 12 and the conductive surface. Also shown in FIG. 2 is a cam pin 26 operably connected to the second support member 8 and the cam member 16, where the cam member 16 is configured to rotate about an axis of the cam pin 26. In some embodiments, cam member 16 may include an aperture into which the cam pin 26 is positioned and affixed (e.g., via a conventional fastener, adhesive, etc.). In some embodiments, cam member 16 may be integrally cast with the cam pin 26 to form a continuous member. In one embodiment, a plurality of cam members 16 (e.g., two) may be operably connected to the cam pin 26 such that each of those plurality of cam members 16 may configured to rotate about the axis of the cam pin 26. Where a plurality of cam members 16 are operably connected to the cam pin 26, each of the plurality of cam members 16 may rotate independently, or collectively about the axis of the cam pin 26. In some cases, the cam member 16 may be spring-loaded, e.g., by a cam spring (e.g. a torsional spring), where the spring-loaded cam member 16 is configured to provide a force against a surface of the brush 12 facing the second support member 8.

Figure 3:
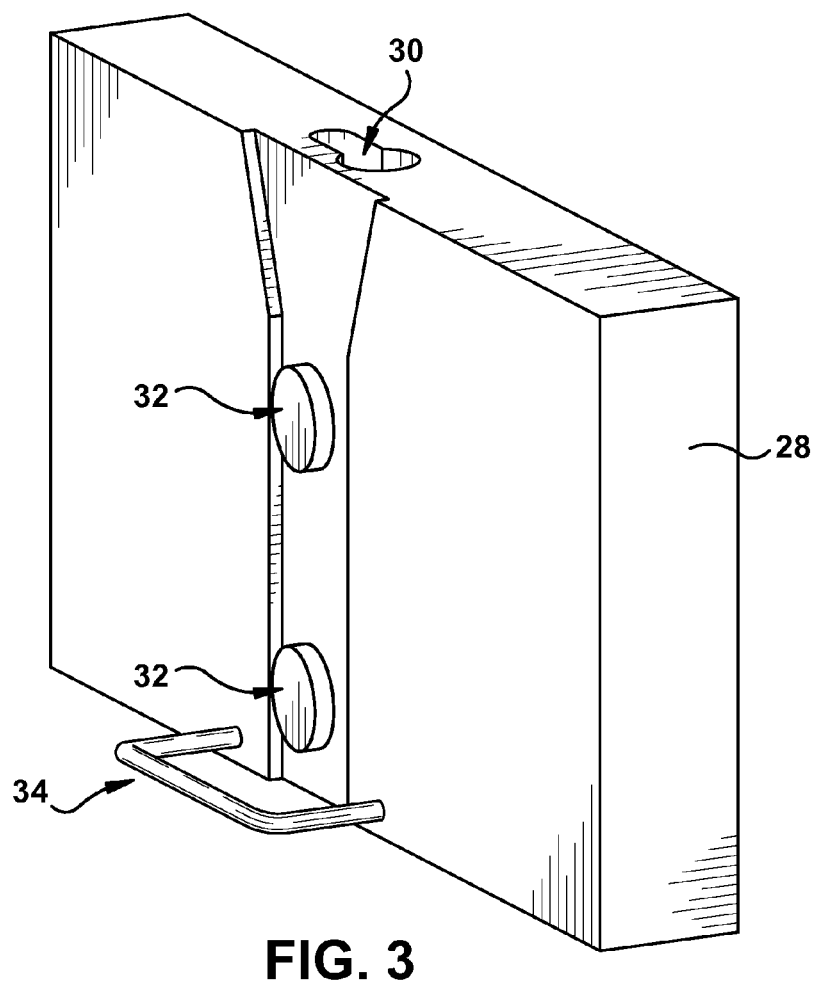
FIG. 3 shows a three-dimensional perspective view of a back plate according to embodiments of the invention.
Figure 4:
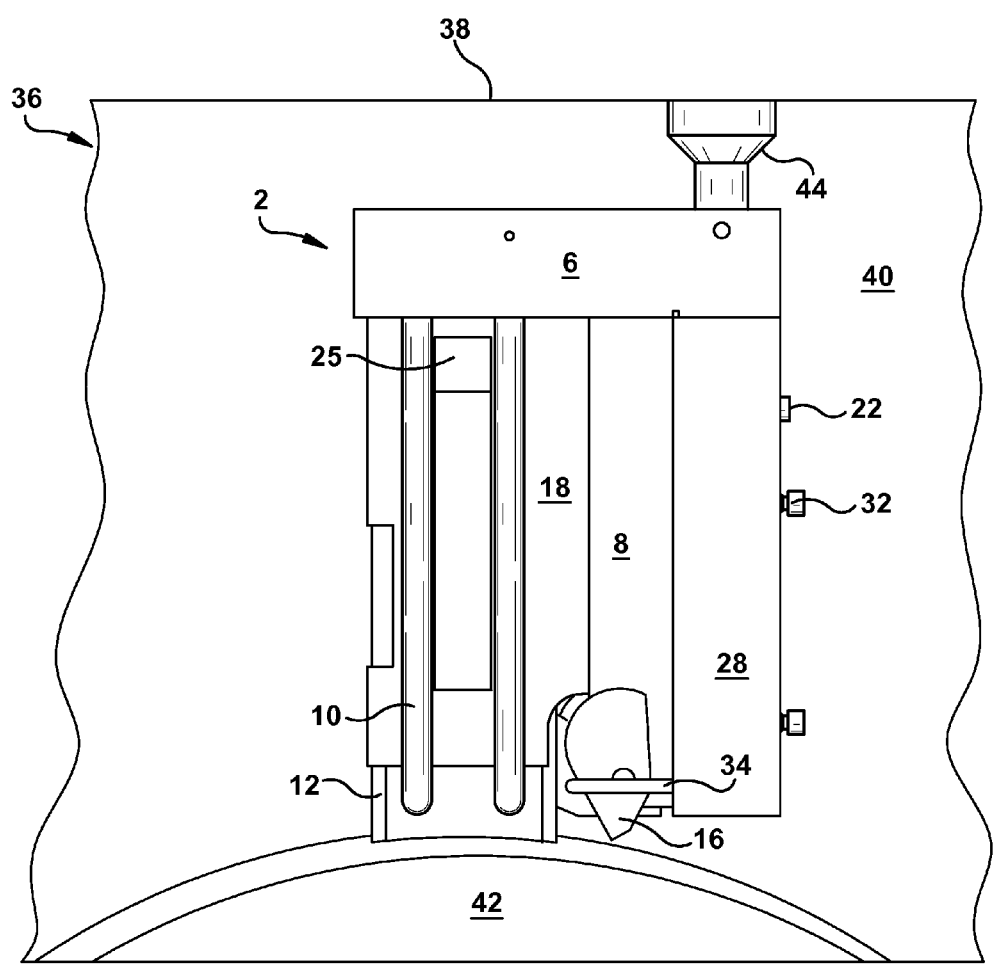
FIG. 4 shows a side view of a brush holder assembly and collector ring according to embodiments of the invention.

FIG. 3 shows a three-dimensional perspective view of a back plate 28 according to embodiments of the invention. Back plate 28 may be configured to couple with the brush holder apparatus 4 (and brush holder assembly 2) shown and described in FIGS. 1-2. Back plate 28 may be configured to operably connect to the first support member 6 via, e.g., the spindle 20 and spindle lock bar 22, which may mate with a slot 30 in the back plate 28. The slot 30 in the back plate 28 may include an elongated portion for receiving the spindle lock bar 22 of the spindle 20. Back plate 28 may further include one or more protrusion members (e.g., a pin such as a button-head pin) 32 for mating with the dovetail slot 24 of second support member 8. It is understood that one or more protrusion member(s) 32 may take the form of any extension configured to fill a portion of the dovetail slot 24 of second support member 8. The protrusion member(s) 32 may extend through a body of the back plate 28 in some embodiments. It is further understood that in alternate embodiments, the second support member 8 may be configured to slide within a slot of the back plate 28 (not shown). In other cases, the back plate 28 and second support member 8 may be configured to couple together in any conventional manner known in the art. Also shown in FIG. 3 is a cam limiter member 34 affixed (e.g., via adhesive, mating pins/slots, etc.) to the back plate 28, the cam limiter member 34 configured to limit movement of the cam member 16 when back plate 28 is coupled to the brush holder apparatus 4 (FIG. 4). While cam limiter member 34 is shown including a bar segment, it is understood that cam limiter member 34 may take alternate forms. For example, cam limiter member 34 may take the form of a wedge protrusion, a tab, a ring, etc. configured to limit movement of one or more cam member(s) 16 as described herein.

FIG. 4 shows a side view of a portion of a dynamoelectric machine (e.g., an electrical generator or motor) 36 according to embodiments of the invention. In one embodiment, dynamoelectric machine 36 may include a dynamoelectric machine housing 38 (partial cut-away shown) substantially containing a stator 40; a rotor collector ring 42; and a brush holder assembly 2 electrically coupling the rotor collector ring 42 and the stator 40. The brush holder assembly 2 may include substantially similar elements as described with reference to the brush holder assembly 2 of FIGS. 1-3, and in one embodiment, brush holder assembly 2 may further include a handle 44. Handle 44 may be configured to actuate movement of the spindle 20 (hidden in this view) and the spindle lock bar 22, allowing the spindle 20 (via the spindle lock bar 22) to engage/disengage the back plate 28. As shown, the cam limiter member 34 is configured to interact with the cam member 16, thereby limiting rotational movement of the cam member 16 (about the cam pin 26, obstructed in this view).

Figure 5:
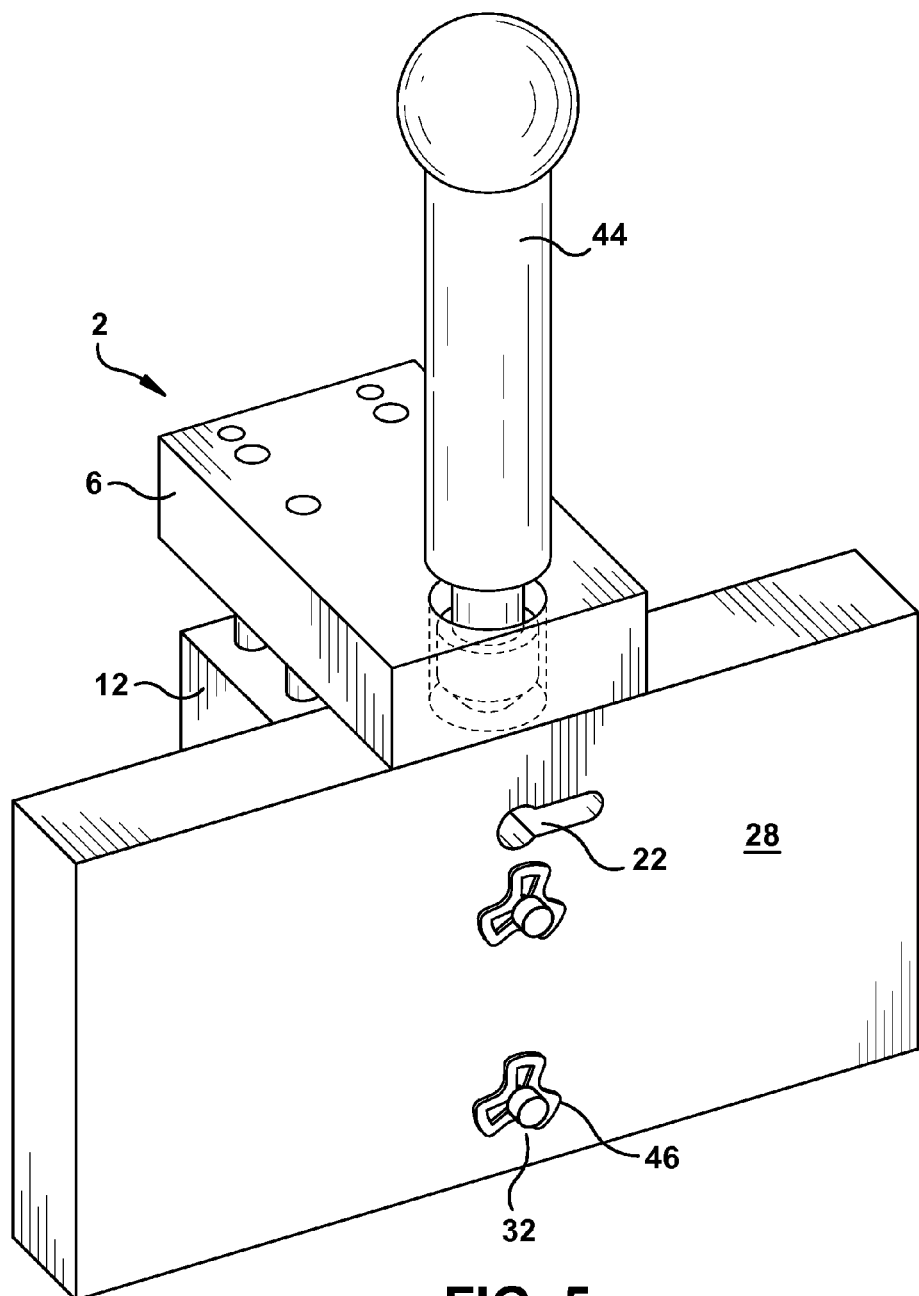
FIG. 5 shows a three-dimensional perspective view of a brush holder assembly according to embodiments of the invention.

FIG. 5 shows a three-dimensional perspective view of a portion of the dynamoelectric machine of FIG. 4, illustrating the interaction of the handle 44 and back plate 28 with respect to the brush holder assembly 2. Movement of the handle 44 may actuate movement of the spindle lock bar 22, allowing for locking or unlocking of the back plate 28 with the spindle 20 (obstructed in this perspective view). Also shown in FIG. 5, in one embodiment, are spring washers 46 for supporting the protrusion members (e.g., pins) 32 where those protrusion members 32 extend through the body of back plate 28.

Returning to FIGS. 1 and 4, and with continuing reference to FIG. 5, aspects of the invention provide for an improved approach to inserting and removing a brush (e.g., brush 12) from a dynamoelectric machine (e.g., dynamoelectric machine 36 of FIG. 4). For example, in one embodiment, a brush 12 may be inserted into the brush holder apparatus 4, e.g., by manually sliding the brush 12 over brush retainment members 10. This may be performed in some cases by a human operator. In some cases, the brush 12 is inserted into the brush holder apparatus 4 prior to connection of the back plate 28 with the spindle 20. That is, in this case, the cam member 16 is free to rotate about the cam pin 26, as the cam retainment member 34 affixed to the back plate 28 is not yet in place to retain the cam member 16. This allows the brush 12 to smoothly traverse a length of the brush retainment member 10, while the force of the cam member 16 (via a cam spring, e.g., a torsional spring) is configured to retain the brush 12 in contact the retainment members 10 and prevent the brush 12 from sliding back down the retainment members 10. In practice, each of a plurality of brushes 12 may be inserted into the brush holder apparatus 4 separately. After placing the brush 12 in the brush holder apparatus 4 (where it is retained by the force of the brush retainment members 10 and cam member 16), the brush holder apparatus 4 (or, brush holder assembly 2 including brush 12) may be coupled to the back plate 28 (e.g., via loading one or more brush holder apparatus 4 into a stationary back plate). The brush holder assembly 2 may engage with the back plate 28 via the spindle 20 and spindle lock bar 22, such that the back plate 28 "locks" the brush holder assembly 2 in place. Once the back plate 28 (including the cam retainment member 34) engage with the brush holder apparatus 4, the cam retainment member 34 will retract the cam member 16 from contact with the brush 12. That is, insertion of the brush holder apparatus 4 into the back plate 28 will allow the cam retainment member 34 to engage the cam member 16 and physically rotate the cam member 16 about the cam pin 26 in a direction away from the brush 16 (e.g., clockwise as shown in FIG. 4). This removes the force of the cam member 16 on the brush 12, thereby allowing the brush spring 25 to force the brush 12 into contact with the rotor collector ring 42 (FIG. 4).

While the brush holder apparatus 4 is in contact with the back plate 28, the cam retainment member 34 will prevent the cam member 16 from contacting the brush 12, thereby allowing the brush 12 to be forced against the rotor collector ring 42 by the brush spring 25. As the brush 12 wears down due to frictional contact with the rotor collector ring 42, the brush spring 25 will keep the eroding surface of the brush 12 in contact with the rotor collector ring 42. When the brush 12 is worn such that it requires replacement, the brush holder apparatus 4 may be disengaged from the back plate 28 (e.g., via actuation of handle 44 and disengaging of spindle 22 with back plate slot 30), which releases the cam member 16, and retains the remaining brush 12 within the brush holder apparatus 4 for removal/replacement.

Figure 7:
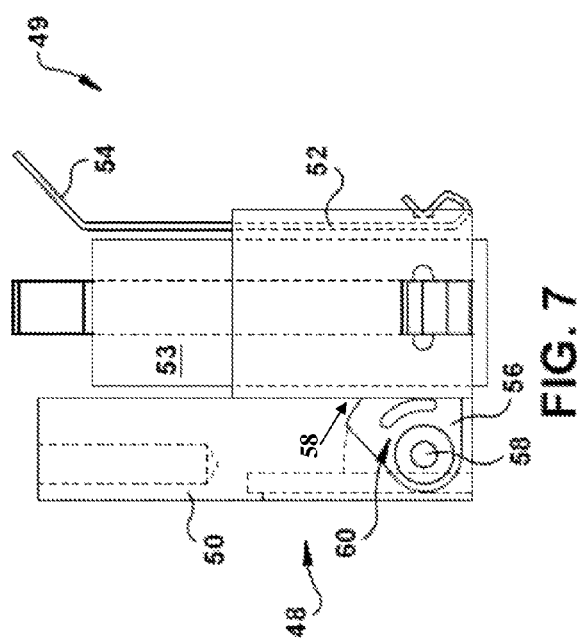
FIG. 7 shows a side view of a brush holder assembly according to embodiments of the invention.
Figure 8:
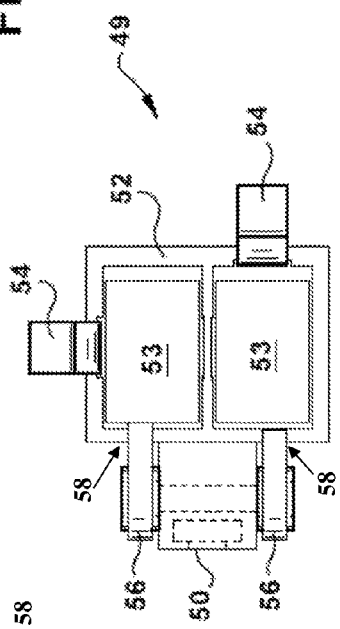
FIG. 8 shows a top view of a brush holder assembly according to embodiments of the invention.
Figure 6:
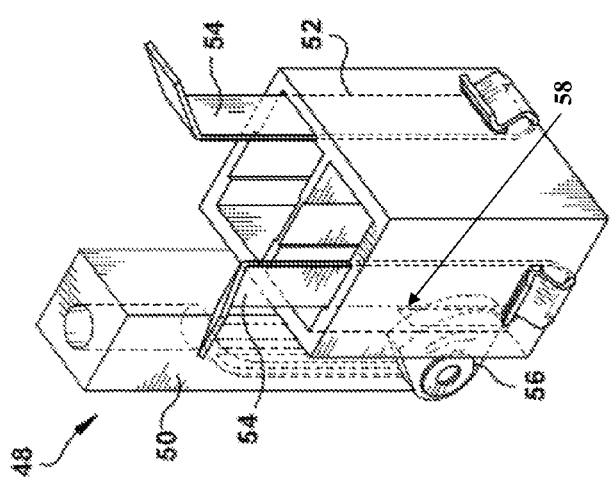
FIG. 6 shows a three-dimensional perspective view of a brush holder apparatus according to embodiments of the invention.

While aspects of the invention are described herein as being used in conjunction with pin-style brush retainers, it is understood that aspects of the invention may be applied to other styled brush retainers. For example, a cam-based retainment system may be used in a box-style brush retainer, such as those shown in FIGS. 6-8. FIG. 6 shows a three-dimensional perspective view of a brush holder apparatus 48 according to embodiments of the invention, while FIGS. 7-8 show side and top views, respectively, of a brush holder assembly 49 according to embodiments of the invention. Turning collectively to FIGS. 6-8, a box-style brush holder apparatus 48 is shown according to embodiments of the invention. In one embodiment, the brush holder apparatus 48 may include a first support member 50 and a box member 52 (or simply, box) affixed to the first support member 50. As is known in the art, the box member 52 may be configured to house a brush 53 (e.g., similar to brushes 12 described herein, with the exclusion of apertures for receiving retainment pins) and hold brush 53 against a conductive surface of a rotor collector ring (e.g., rotor collector ring 42). Brush holder apparatus 48 may further include a spring support member 54 (e.g., a metal plate) affixed to the box member 52 (e.g., via an aperture, clamp, pin, slot, etc.). In some embodiments, portions of the spring support member 54 extend substantially parallel with an inner surface of the box member 52 and are configured to support a conventional spring (not shown), which may apply a downward (radially inward) force on the brush 53 to partially hold the brush 53 against the conductive surface of the rotor collector ring. As shown, the spring support member 54 extends along a length of an inner surface (wall) of the box member 52.

Also shown is a cam member 56 operably connected to the first support member 50, such that the cam member 56 is configured to retain the brush 53 against an inner surface 55 of the box member 52. The cam member 56 may be configured to rotate about a cam pin 58, which may be situated in an aperture within first support member 50 (aperture obstructed by pin 58). Cam member 56 may further be configured to engage with (and partially extend through) a slot 58 within box member 52, thereby allowing movement of the cam member 56 within the slot 58 of the box member 52 as a brush 53 is inserted and/or removed from brush holder apparatus 48. Not shown in this view is a cam limiting member, which may be similar to the cam limiting member 34 shown and described with respect to the pin-style brush holder of FIGS. 1-5. In any case, it is understood that the brush holder apparatus 48 and brush holder assembly 49 shown and described herein may provide similar advantages over conventional brush holders as those described with respect to the pin-style holders of FIGS. 1-5.

That is, the brush holder apparatus 48 and brush holder assembly 49 shown and described herein may provide several advantages over conventional brush holder apparatuses and assemblies. For example, the brush holder apparatuses and brush holder assemblies shown and described herein may accommodate (e.g., retain) a variety of brushes (e.g., brush 12, brush 53, etc.) having different dimensions while still providing secure retention of those brushes within a dynamoelectric machine. As noted herein, the cam-style brush retainers may rotate as required to accommodate a brush and retain/prevent that brush from sliding either on the pins 10 (FIGS. 1-5) or within the box member 52 (FIGS. 6-8) when the brush (e.g., brush 12 and/or brush 53) is inserted or removed from contact with a conductive surface (e.g., a surface of a dynamoelectric machine collector ring). Additionally, as compared with conventional brush holder apparatuses and assemblies, aspects of the invention provide for brush holder apparatuses and assemblies that may reduce the time and effort required to install and/or replace brushes (e.g., brush 12 and/or brush 53) in a dynamoelectric machine. Additionally, the cam-style holders shown and described herein may allow for installation and/or replacement of brushes using a single hand (e.g., one operator's hand). This may provide advantages, for example, safety and efficiency advantages, over the conventional systems and approaches.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A brush holder apparatus for receiving a set of two brushes, the brush holder apparatus comprising:
   a first support member;
   a box member affixed to the first support member, the box member including a set of two slots extending through a side of the box member; and
   a set of two cam members each operably connected to the first support member and separated by the first support member, wherein each cam member includes a rounded surface partially extending through one of the set of two slots and is configured to move within the one slot, and wherein each cam member is configured to retain a distinct brush in the set of two brushes against an inner surface of the box member, wherein each of the set of two cam members move independently of one another.

2. The brush holder apparatus of claim 1, wherein each cam member is configured to directly contact the distinct brush and retain the distinct brush against the inner surface of the box member as each distinct brush traverses a length of the inner surface of the box member.

3. The brush holder apparatus of claim 1, further comprising a spring support member operably connected to the box member, the spring support member extending along a length of the inner surface of the box member.

4. The brush holder apparatus of claim 3, further comprising a brush spring affixed to the spring support member, the brush spring configured to secure a brush in the set of two brushes against a moving conductive surface.

5. The brush holder apparatus of claim 1, further comprising:
   a back plate operably connected to the first support member; and
   a cam limiter member affixed to the back plate, the cam limiter member configured to limit movement of at least one of the set of two cam members within the slot.

6. The brush holder apparatus of claim 1, further comprising a cam pin operably connected to the first support member and each of the set of two cam members, each of the two cam members configured to rotate about an axis of the cam pin and move within one of the two slots.

7. The brush holder apparatus of claim 6, further comprising a set of two cam springs each configured to rotate one of the cam members about the axis of the cam pin.

8. The brush holder apparatus of claim 1, wherein the first support member is located between the two cam members.

9. The brush holder apparatus of claim 1, wherein the rounded surface of each cam member is configured to directly contact a brush in the set of two brushes.

10. The brush holder apparatus of claim 1, wherein each of the set of two cam members is configured to directly contact each distinct brush to retain each distinct brush against the inner surface of the box member.

11. The brush holder apparatus of claim 1, wherein the side of the box member is adjacent set of two openings for receiving the set of two brushes.

* * * * *